Sept. 27, 1955 S. STEUERMAN 2,718,761
TREATING GRANULAR SOIL AND LIKE MASSES
Filed April 7, 1953
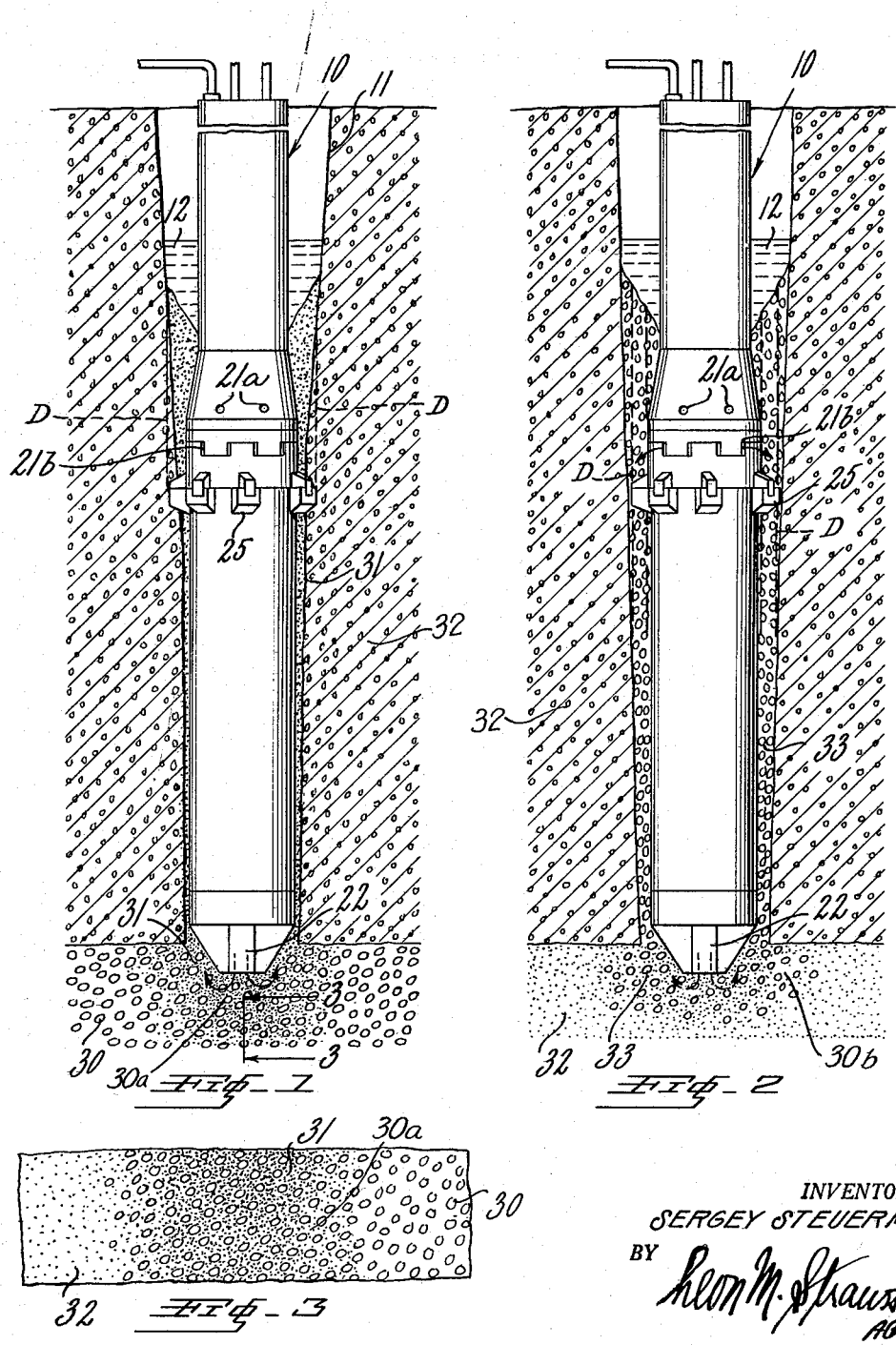
INVENTOR.
SERGEY STEUERMAN
BY
AGT.

United States Patent Office 2,718,761
Patented Sept. 27, 1955

2,718,761
TREATING GRANULAR SOIL AND LIKE MASSES
Sergey Steuerman, New York, N. Y.
Application April 7, 1953, Serial No. 347,261
7 Claims. (Cl. 61—36)

This invention relates to improvements in or relating to the treatment of granular ground or soil masses for foundations and like structures with the ultimate aim of compacting same by means of vibratory devices.

It has been found by experience that compaction of granular materials of which, for instance, sandy soil consists, decreases its permeability and also causes increase of the internal angle of friction of the compacted soil. It is of importance for structural and other purposes to bring about high impermeability for foundations of water retaining structures. Increase of the angle of internal friction influences and improves soil properties for structural purposes, such as, passive supporting pressure, bearing capacity, active pressure, etc.

In practice, however, it has been found that some typical granular soil strata even if compaction of such strata to a relatively high density is carried out may be further improved.

It has been found that with strata of materials containing granules of different dimensions or sizes higher impermeability and a larger angle of internal friction may be produced than with strata of materials consisting mainly of substantially uniform or equally sized granules at the same relative density.

The present invention contemplates to apply the aforesaid finding to the compaction or like treatment, in particular, of soils which, due to geological conditions of sand deposition, present a high degree of uniformity in the size of the granules of which such soil strata consist.

It is therefore one of the primary objects of this invention to provide means facilitating intrusion of granules of different size or sizes in soil strata principally composed of granules of uniform grain size, and further establishing simultaneously therewith, compaction of such treated soil for achieving foundations suitable for various structures.

Another object of the present invention is to provide means ensuring thorough mixture of substantially uniformly coarse or fine sand strata with sand or like material essentially containing granules of a size or sizes different from those present in the coarse or fine sand strata of the soil while the latter is under treatment of compaction.

Still another object of the present invention is to provide means affording the disposition of material of relatively coarse granules in strata of relatively fine granules of soil or vice versa and exposure of such treated and mixed materials to vibrations, while the same is imbued with a suitable liquid and is subjected to pressure, to thereby accomplish within the soil rapid and highly economical compaction to a desired degree of density.

Yet another object of the invention resides in the provision of means entailing marked reduction of surface tension on granules in a soil stratum.

Still a further object of the invention is to provide means conducive to enhanced and easy operation for compacting soil and like material, which would be normally considered impossible to achieve within the soil if the latter is composed of coarse grains of substantially equal size throughout, as vibratory devices would encounter extremely high resistance to penetration of such layers of coarse granules.

This invention is further directed to vibratory means for accomplishing the operational steps hereinabove disclosed.

Other advantages, objects and characteristic features of the invention will become further clear as the description thereof ensues, and further from the accompanying claims as well as from the drawing in which:

Fig. 1 shows schematically the introduction of vibratory means provided with fins into a cavity or bore provided in soil and illustrates a treatment step according to the invention when said vibratory means meets a relatively coarse sand layer within said soil;

Fig. 2 illustrates schematically, treatment steps according to the invention similar to those of Fig. 1, but applied to a relatively fine sand layer of substantially uniform grain size and subsequent stepwise withdrawal of the vibratory means.

Fig. 3 is an enlarged vertical section of the layer of Fig. 1 or 2 treated according to the invention, the section being taken along lines 3—3 of Fig. 1.

Referring now more particularly to the drawing, there is shown vibrator 10 inserted in a soil cavity 11. The forward nozzle end 22 of vibrator 10 has come into contact with a layer 30 of uniform and relatively coarse sand granules, which layer extends in the soil below crater or cavity 11. Heretofore, certain difficulties were encountered to traverse such layer by the vibrator and it was considered uneconomical, time consuming and practically impossible to treat or compact such layer.

According to the invention, intrusion and mixing of the coarse granules prevailing in the aforesaid sand layer 30 with sand granules of distinctly different grain size 31 (such as fine sand granules supplied to the cavity and interspersed or intercalated with the granules of said layer 30 by the action of water discharge at nozzle 22 from and centrifugal force developed by the vibrator 10), was found to overcome this difficult task in the foundation technique, resulted in rapid compaction of the such treated layer 30 and improved such soil as a suitable foundation for different structures. Fig. 3 illustrates layer 30 in section and after treatment with water and fine sand during a predetermined time.

In order to achieve the above described improvement, material 31 of a grain size distinctly different from that prevailing in the treated layer 30 of the soil is filled into crater 11 extending to the depth of the treated soil layer, then this zone of added material 31 and surrounding soil is vibrated and water is injected into this zone to flow inside the treated material in a predetermined direction. Sometimes a surcharge is applied upon such treated zone. Under the influence of this treatment the added material 31 and the treated soil are both brought temporarily into a state of viscous mass having the tendency to spread outward due to the applied centrifugal force of the vibrator, with the result that the fine sand particles 31 intrude among the coarse particles 30 filling out the interstices in the coarse material and simultaneously the entire mixed material in the treated zone attains the highest possible density.

For example, during treatment of such soil layer of relatively dense coarse sand 30, consisting of uniformly sized grains of approximately 1/8" diameter, which is superimposed by a layer 32 of fine sand, had to be traversed by the vibrator device for soil treatment. After providing the bore or cavity 11 and when the lower nozzle 22 of the vibrator 10 entered into this coarse sand layer 30, water introduced through this latter nozzle did not rise around the vibrator but seeped through and dissipated into the coarse layer. Although the energy input into the drive motor of the vibrator was permitted to rise above the usual safety limit, further downward movement of the vibrator could not be achieved.

Supply of relatively fine sand containing a large percentage of fines passing through a 100 mesh sieve (grain diameter of about $\frac{1}{80}$ of an inch) into the bore or crater was made, which surrounds the vibrator. This fine sand was forced by gravity, further by water flow from the nozzle 22 and simultaneous vibrations and also through centrifugal force emanating from the vibrator in horizontal direction into the coarse sand layer 30, whereby in the coarse sand layer 30 the fine sand 31 was distributed and arranged in the interstices of said coarse sand layer. Due to this intrusion of fines into the coarse sand material, water from the lower nozzle 22 of the vibrator was then forced to move in upward direction, past the vibrator and through channels D cut by the movements of the fins 25 of the vibrator to a water level 12, this rising water flow producing a temporary quick state in the lower coarse sand material 30 and initiating an immediate downward movement of the vibrator.

Undisturbed samples taken from the soil thus treated (see layer 30a) by a single treatment application showed that a complete intrusion of fines inside the coarse sand layer was achieved within a radius of about 3 to 4 feet from the center axis of the vibrator. Some 20% of the treated sand volume had to be added in fines for this intrusion step. The resultant mixture of coarse sand and fine sand proved to be thoroughly and completely compacted being of very low permeability and high bearing capacity (see Fig. 3).

The ability of the vibrator to push material surrounding it in horizontal direction is demonstrated by the fact that added fine sand material is found in a distance up to about 5 feet from the axis of the vibrator. This explains also the fact that it was now possible to compact soil underneath existing footings with no settlement below said footing: sand supply was forced by the vibrator outwardly, thus compensating the volume reduction of compacted soil under the footing.

In the case of the presence of powdery or fine sand layer 32 (80% passing through 200 mesh sieve) treatment of the soil was impeded in view of the small radius of water penetration into such sand layer (Fig. 2). By supplying coarse sand 33 (composed of granules of approximately $\frac{1}{16}$ of an inch in diameter) into the space of the crater or bore surrounding the vibrator 10 and due to outward centrifugal movement of the coarser particles of the supplied coarse sand 33, the permeability of the fine sand soil 32 was sufficiently increased to allow for successful compaction of a 7 foot cylindrical area at 30b. In this case, the use of a vibrator with fins 25 at its head proved to speed up compaction due to the fact that coarser material accumulated in the channels D cut and formed by the movements of the fins 25, facilitated vertical water movement around the vibrator to a considerable extent, whereby the compaction of such treated soil was rapidly and securely carried into effect.

Thus, it was found, that if the soil contains uniformly fine grains, the added or supplied material shall contain mainly coarse grains, at least 10 times larger than the prevailing size of the soil grains. If the soil contains uniformly coarse grains, the added material shall contain mainly fine grains at least 10 times smaller than the grains prevailing in the soil. The resultant mass is in both cases a mixture of coarse and fine sand which was compacted to the highest degree.

This aforedescribed intrusion can be further facilitated by chemical treatment of the added material or of the injected water, or of both, thus contributing to the reduction of surface tension on the grain surface.

Many different admixtures have been recently developed for this purpose. All of these admixtures relieve the surface tension on the surface of the grains and facilitate the intrusion of fine grains among the large or coarse ones.

The process according to the invention is briefly characterized as follows:

Introduction into soils of uniform grain size of granules of a different size not only produces a better end product, but is helpful during the compacting process: when the soil consists of uniform-sized coarse grains (layer 30), its permeability may be so large that water introduced into it for treatment purposes dissipates without producing the necessary effect. In this case an added layer of fine sand grains (layer 31) helps to direct the water flow by diminishing the permeability of this layer. In a uniformly fine grained soil addition of coarse grains provides a temporary channel for water movement.

The vibrator with water nozzles 22, 21a, 21b may be put into action at first at the surface of the soil to be treated, whereby water is flowing from nozzles 22 located at the lower end of the vibrator. Under the influence of simultaneous action of vibration and of water flow rising around the vibrator, soil surrounding the vibrator obtains temporarily quicksand properties and the vibrator sinks under its own weight, as well as by the weight (not shown) of its follow-up pipes or by means of a surcharge (additional weight) into the soil. At the same time the centrifugal force of the vibrator throws the material surrounding it outwardly while precompacting the walls of the crater or cavity forming around the sinking vibrator.

Rising of water around the vibrator is due to the fact that the resistance of vibrated granular material against water flow is smaller than that of non-vibrated material. When the layer 30 just beneath the vibrator consists of uniform coarse grains with high porosity, water from the lower nozzles 22 dissipates in this coarse layer without flowing upwards and the vibrator is not able to move downwardly. In this case, addition of fine sand material 31 should already take place during the downward movement of the vibrator, to fill out the interstices of the coarse layer 30 and to reduce the permeability of the substrata, thus forcing the water flow in an upward direction. Sinking of the vibrator is then achieved even in dense coarse soil. Adding of fine sand material may be stopped when the vibrator has penetrated the layer of coarse, uniform sand.

After the vibrator has reached the required depth, the final treatment is initiated, by retracting the vibrator 10 step by step, while still fine sand granules are supplied from above into the cavity 11 (in the case of treatment of coarse sand layer) or a mixture of sand material with coarse sand granules and fine sand granules is added, in which, for example, fine sand granules prevail. The water flow is then reversed, using the nozzles 21a, 21b located at the top of the vibrator. The choice of the granulometry of the additional material depends on that of the soil layer to be treated, as described above. Under the simultaneous influence of vibration and downward water flow from the vibrator, the treated material spreads outwardly, fine grains intrude among the coarse sand granules and this mixture is then compacted to a high relative density. When vibrator 10 is thus retracted step by step (with nozzles 22 shut off) channels D disappear during the ensuing dense compaction achieved in crater 11.

As a chemical referred to hereinabove, trace amounts of sodium tetraphosphate may be employed.

A suitable form of vibrator for compaction of such natural soil is described in U. S. Patent Application Ser. No. 295,526 filed June 25, 1952.

It can thus be seen from the above disclosure that there has been provided in accordance with this invention a method of compacting soil having at least one layer of a material with granules of substantially uniform size, comprising first introducing vibratory means for contact with the deepest portion of said one layer within said soil, following successively the steps of supplying to said one layer composed of substantially uniform, coarse sand and within said soil granular material consisting of substantially fine sand having predominantly granules of a size at least ten times finer than the size of said coarse material, subjecting said one layer material and said supplied material to vibrations in transverse direction to the axis of said vibratory means, simultaneously introducing a water flow into said one layer material, whereby said supplied granular material is forced into said one layer material and is internally distributed between the granules of the latter for compacting said one layer material, retracting said vibratory means within said one layer a predetermined distance, and repeating the aforesaid successive steps until said vibratory means reaches the top end of said one layer material.

It is obvious that various changes may be made in the details of the method without departing from the spirit of this invention, and it is therefore to be understood that this invention is not to be limited to the specific details described.

Having thus described the invention, what is claimed as new and desired to be secured by Letters Patent, is:

1. The method of treating soil in which material prevails having granules of substantially uniform size; comprising the steps of first providing a cavity in the soil, then supplying to said cavity granular material consisting of granules substantially different in size in regard of the prevailing size of granules within the soil material under treatment, whereby the predominant size of the granules of one of said materials is at least ten times the predominant size of the granules of the other material, subjecting said soil material and said supplied material to vibrations in lateral direction to and at the lower end of said cavity, and simultaneously introducing a liquid into said cavity to cause liquid flow from the cavity into the soil surrounding said cavity, until the supplied granular material is spread to an area adjacent said end and within the soil and is internally distributed between the granules of said soil area thereby thoroughly compacting the mixture of said supplied granular material and said adjacent soil material.

2. The method of treating soil in which material prevails having granules of substantially uniform size; comprising the steps of first providing a funnel-shaped cavity in the soil material, then supplying into said cavity granular material consisting of granules substantially different in size in regard of the prevailing size of granules within the soil material under treatment, whereby the size of granules of said prevailing soil material and the size of the granules of said supplied material differ from each other in a ratio of at least 10:1, subjecting said soil material and said supplied material to vibrations in lateral direction to and at the lower end of said cavity, and simultaneously introducing a liquid into said cavity to cause flow of said liquid from the cavity into the soil surrounding said cavity, until the supplied granular material is spread to an area adjacent said end and within the soil and is internally distributed between the granules of said soil area thereby thoroughly compacting the mixture of said supplied granular material and said adjacent soil material.

3. The method of treating soil in which material prevails having granules of substantially uniform size; comprising the steps of first providing a funnel-shaped cavity in the soil material, then supplying into said cavity granular material consisting of granules substantially different in size in regard of the prevailing size of granules within the soil under treatment, whereby the approximate ratio between the predominant size of granules of said soil material and the size of granules of said supplied material is at least 1:10, subjecting said soil material and said supplied material to vibrations, while simultaneously introducing a liquid into said cavity to flow from the latter into the soil surrounding said cavity, until the supplied granular material is spread to an area adjacent said end and within the soil and is internally distributed between the granules of said soil area thereby thoroughly compacting the mixture of said supplied granular material and said adjacent soil material.

4. The method of treating soil in which material prevails having granules of substantially uniform size; comprising the steps of first providing a funnel-shaped cavity in the soil, then supplying into said cavity granular material consisting of granules substantially different in size in regard of the prevailing size of granules within the soil under treatment, whereby the predominant size of the granules of said soil material is composed of substantially coarse sand and is at least ten times larger than the predominant size of the granules of said supplied material constituting substantially fine sand, subjecting said soil material and said supplied material to vibrations in lateral direction to and at the lower end of said cavity, and simultaneously introducing water into said cavity to flow from said cavity into the soil surrounding said cavity, until the supplied granular material is spread to an area adjacent said end and within the soil and is internally distributed between the granules of said soil area thereby thoroughly compacting the mixture of said supplied granular material and said adjacent soil material.

5. The method of treating soil in which material prevails having granules of substantially uniform size; comprising the steps of first providing a funnel-shaped cavity in the soil, then supplying into said cavity granular material consisting of granules substantially different in size in regard of the prevailing size of granules within the soil under treatment, whereby the predominant size of the granules of said soil material is composed of substantially fine sand and is at least ten times finer than the predominant size of the granules of said supplied material formed of substantially coarse sand, subjecting said soil material and said supplied material to vibrations in lateral direction to and at the lower end of said cavity, and simultaneously introducing a liquid into said cavity to flow from said cavity into the soil surrounding said cavity, until the supplied granular material is spread to an area adjacent said end and within the soil and is internally distributed between the granules of said soil area thereby thoroughly compacting the mixture of said supplied granular material and said adjacent soil material.

6. The method of compacting soil having at least one layer of a material with granules of substantially uniform size; comprising first introducing vibratory means for contact with said one layer within said soil, following successively the steps of supplying to said one layer composed of substantially uniform, coarse sand and within said soil granular material consisting of substantially fine sand having predominantly granules of a size at least ten times finer than the size of said coarse material, subjecting said one layer material and said supplied material to vibrations in transverse direction to the axis of said vibratory means, simultaneously introducing a water flow into said one layer material, whereby said supplied granular material is forced into said one layer material and is internally distributed between the granules of the latter for compacting said one layer material, retracting said vibratory means within said one layer a predetermined distance, and repeating the aforesaid successive steps until said vibratory means reaches the top end of said one layer material.

7. The method of compacting soil having at least one layer of a material with granules of substantially uniform size; comprising first introducing vibratory means for contact with said one layer within said soil, then applying the successive steps of supplying to said one layer composed of substantially uniform, fine sand granular material substantially coarse sand and having predominantly granules of a size at least ten times coarser than the size of said fine material, subjecting said one layer material and said supplied material to vibrations in transverse direction to the axis of said vibratory means, simultaneously introducing a water flow into said one layer material, whereby said supplied granular material is forced into said one layer material and is internally distributed between the granules of the latter for compacting said one layer material, retracting said vibratory means within said one layer a predetermined distance, and repeating the aforesaid successive steps until said vibratory means reaches the end of said one layer material.

References Cited in the file of this patent

UNITED STATES PATENTS

| | | |
|---|---|---|
| 922,106 | Ducastel | May 18, 1909 |
| 935,081 | Wofsholz | Sept. 28, 1909 |
| 1,598,300 | Moran | Aug. 31, 1926 |
| 2,334,228 | Steuermann | Nov. 16, 1943 |